Feb. 21, 1967  R. E. SOLOMON  3,305,174
TIMER ADJUSTED OVEN TEMPERATURE CONTROL
Filed Feb. 5, 1964  2 Sheets-Sheet 1

INVENTOR.
RALPH E. SOLOMON
BY
Lyon & Lyon
ATTORNEY

Feb. 21, 1967    R. E. SOLOMON    3,305,174
TIMER ADJUSTED OVEN TEMPERATURE CONTROL
Filed Feb. 5, 1964    2 Sheets-Sheet 2
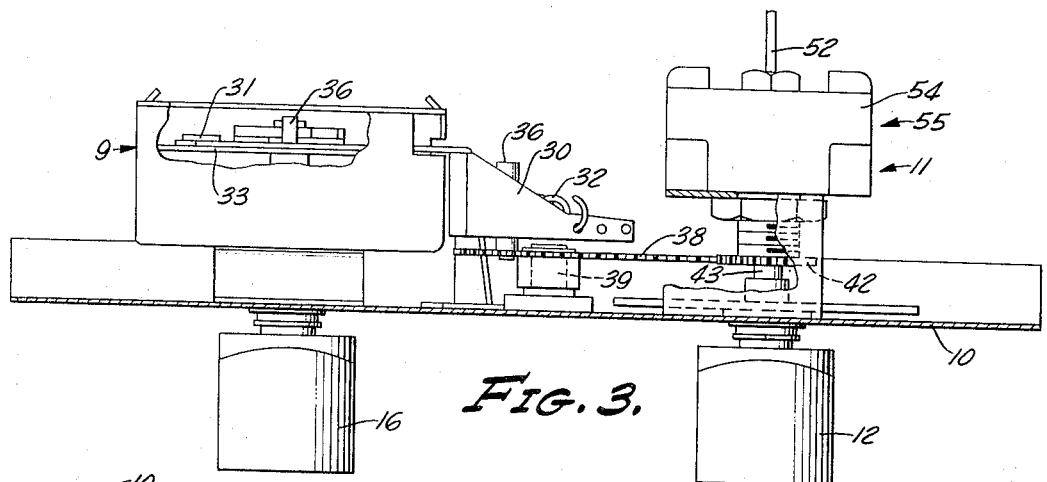
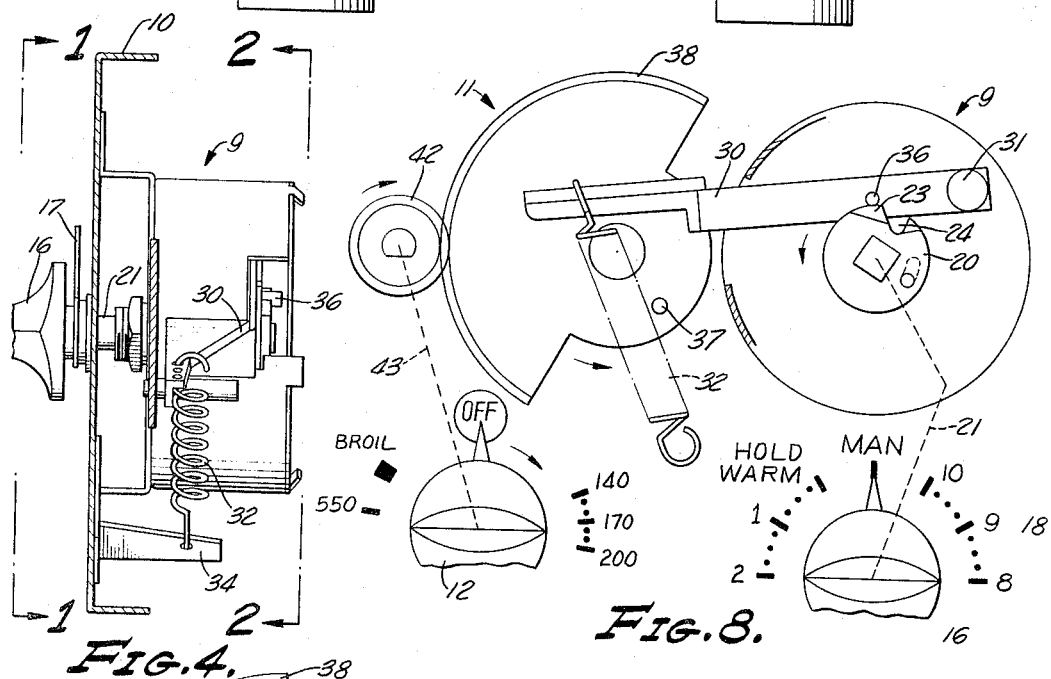
INVENTOR.
RALPH E. SOLOMON
BY
Lyon & Lyon
ATTORNEYS

United States Patent Office 3,305,174
Patented Feb. 21, 1967

3,305,174
TIMER ADJUSTED OVEN TEMPERATURE CONTROL
Ralph E. Solomon, Playa Del Rey, Calif., assignor, by mesne assignments, to International Telephone and Telegraph Corporation, New York, N.Y., a corporation of Maryland
Filed Feb. 5, 1964, Ser. No. 342,629
2 Claims. (Cl. 236—46)

The present invention relates to means and techniques useful in domestic oven controls and involves generally a mechanical connection between a manually adjustable temperature control and a manually adjustable timer for automatically adjusting the temperature control to predetermined setting.

Briefly, as described hereinafter, there is provided a manually settable thermostat and a manually adjustable mechanical timer. The thermostat is manually set to a cooking temperature and the timer is manually set at the number of hours to cook. In the process of manually setting the timer, energy is stored in a spring-loaded lever which is released at the end of the time cycle, and the lever returns the thermostat to a low temperature setting or to an off position. As illustrated herein, the thermostat is automatically set to a temperature setting of 170° F. which is considered a good "hold-warm" or serving temperature. At the end of such time cycle the timer is in a returned position referred to as a hold-warm position; and also the timer has a manual position in which energy is stored in said lever in adjustment of the timer from its hold-warm position to its manual position. In all positions of the timer, except in the hold-warm position, the thermostat may be adjusted for temperatures higher than the hold-warm temperature.

It is accordingly an object of the present invention to provide means and techniques for accomplishing the above indicated functions and results.

A specific object of the present invention is to provide a manually settable temperature control and a manually adjustable timer which are interlocked such that after an elapsed time the temperature control is automatically reset.

Another specific object of the present invention is to provide an improved oven control in which cooking may be accomplished for a predetermined settable time at an elevated temperature and after such predetermined time the oven is automatically controlled at a lower temperature.

Another specific object of the present invention is to provide specific mechanical constructions for accomplishing these above indicated features, functions and results.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 3 is a top plan view taken generally as indicated by the line 3—3 in FIG. 1;

FIG. 4 is a view taken generally as indicated by the lines 4—4 in FIG. 2;

FIGS. 8 and 9 illustrate in somewhat diagrammatic form some of the operating elements in different positions.

Figure 1:
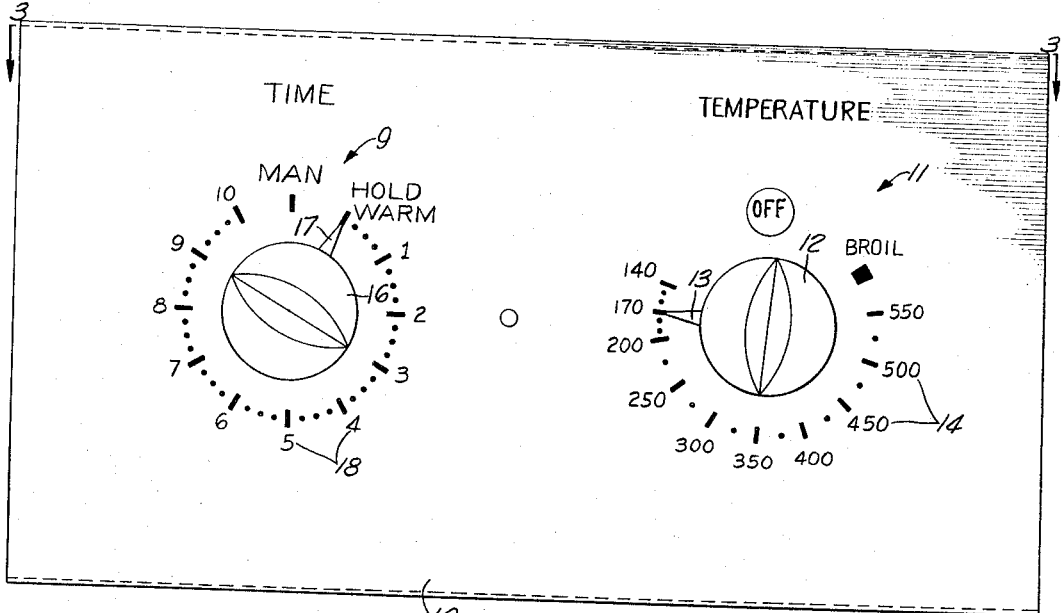
FIG. 1 illustrates a front elevation view of apparatus embodying features of the present invention, the view being taken generally as indicated by the line 1—1 in FIG. 4.

In FIG. 1, a panel 10 mounts a manually settable temperature control 11 and a manually settable timer control 9, the control 11 incorporating a knob 12 with its pointer 13 cooperating with temperature indicia 14 including markings on the panel extending from 140° F. to broil, although such control may be set for temperatures lower than 140° F. The timer control 9 incorporates the knob 16 having a pointer 17 thereon cooperating with indicia 18 on the panel and, as illustrated, the knob 16 may be set to a manual (MAN) position, a "Hold Warm" position and also positions extending counterclockwise from the Hold Warm position to the "10" position. The numerals 1–10 have reference to the number of hours, and it will be seen that the "Hold Warm" position corresponds to a 0 hour position.

By turning the knob 12 with the timer control set in its manual position, the operator may select any particular temperature extending from below 140° F. to a broil temperature; and also the operator by turning the knob 16 may select the number of hours during which cooking is accomplished.

The timer 9 is a modified conventional mechanical timer which incorporates conventional means for progressively returning the knob 16 from an hour setting to the 0 or Hold Warm setting. The timer control 9 is modified to include structure described later for automatically setting the temperature control knob 12 from an elevated temperature setting to the 170° F. or Hold Warm temperature setting when and as the time control knob 16 reaches its zero or Hold Warm position.

Figure 2:
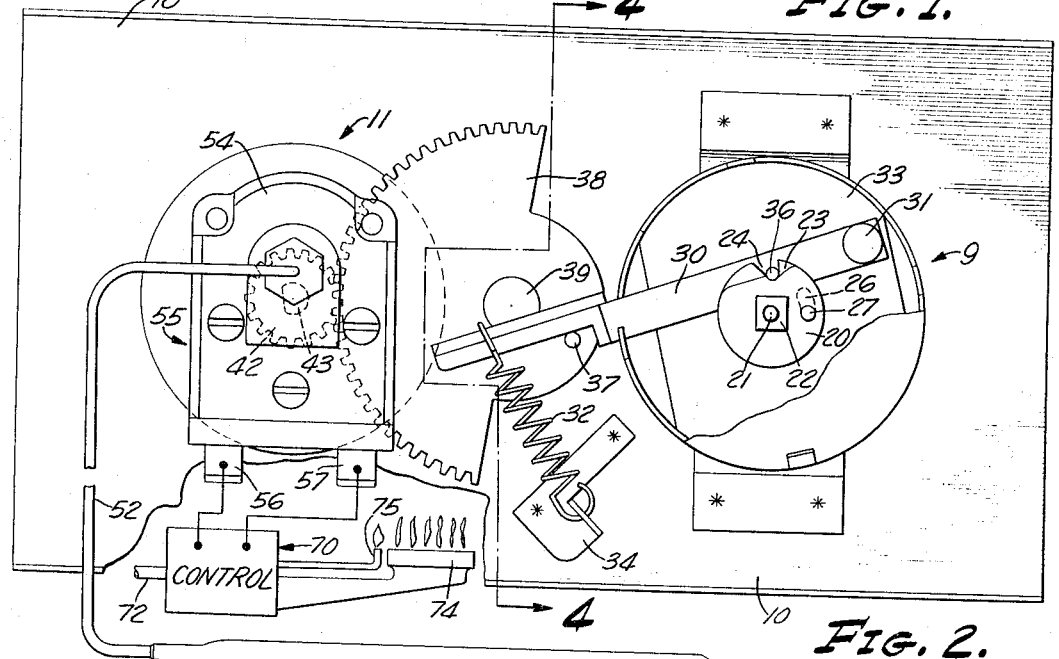
FIG. 2 illustrates the back of the control shown in FIG. 1 and is a view taken generally as indicated by the lines 2—2 in FIG. 4.
Figures 5, 6, 7:
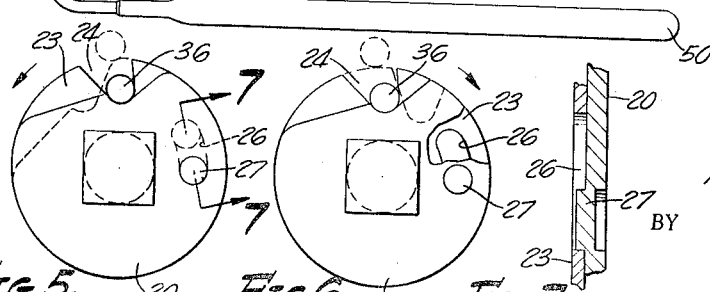
FIGS. 5 and 6 show different operating positions of elements of the timer illustrated in FIG. 2.
FIG. 7 is a sectional view taken generally along the line 7—7 of FIG. 5.

As seen in FIG. 2, the timer control 9 has a cam disc 20 mounted on its shaft 21 which, as illustrated in FIG. 2, has a square-shaped element 22 thereon for securing the cam disc 20 on such shaft 21. The shaft 21 is the rotatable shaft of the conventional timer which is rotated by manual rotation of the timer knob 16 (FIG. 1) and which is progressively returned to a 0 position or Hold Warm position when and as the timer times itself out. A disc 23 having a V-shaped notch 24 is loosely mounted on shaft 21 so that its movement with respect to the cam disc 20 is limited by the construction perhaps best seen in FIG. 7 wherein the disc 23 has a lost motion slot 26 into which a dimpled portion 27 of cam disc 20 extends. With such an arrangement, rotation of shaft 21 initially causes movement of only cam disc 20 until disc 20 has moved a sufficient amount to cause loosely mounted disc 23 to be moved, through lost motion slot 26 and dimpled portion 27. Similar action occurs when shaft 21 is rotated in the opposite direction. The diameter of disc 23 is slightly larger than the diameter of the cam disc 20.

A lever 30 has one of its ends pivotally mounted on a pin 31 which is secured to a stationary plate 33 of the conventional timer, and the other end of lever 30 has attached thereto one end of a coil tension spring 32, the other end of spring 32 being attached to a bracket 34 on the panel 10 such that a pin 36 on an intermediate portion of lever 30 is constantly urged towards the disc 23. This lever 30 in its position shown in FIG. 2 is in engagement with a pin 37 on a sector gear 38 having an axle 39 rotatably supported on panel 10. The gear 38 is in mesh with a gear 42 which is secured to the same shaft 43 that mounts the knob 12 in FIG. 1 so that, as shown in FIGS. 1 and 2, the knob 12 is then at its Hold Warm or 170° F. temperature setting.

The temperature control 11 is of conventional construction and includes a bulb 50 connected by flexible tubing 52 to a switch housing 54 to produce operation of a switch 55 having the terminals 56, 57 in accordance with expansion of a fluid contained in bulb 50 and tubing 52. As is conventional, the knob 12 mounted on shaft 43 is used to adjust the temperature control for a particular temperature at which expansion of the fluid in bulb 50 opens the contacts of switch 55 having the terminals 56, 57. This standard or conventional temperature control is modified as indicated previously to incorporate the gear 42 on shaft 43 so that the shaft 43 and the knob 12 thereon may be automatically rotated to the Hold Warm or 170° position when the pin 36 on lever 30 enters the notched portion 24 of disc 23 at the end of the timing cycle.

As illustrated in FIG. 2, the switch 55 having the terminals 56, 57 is connected electrically to an electromagnetically operated gas control system 70 which controls the flow of gas from an inlet line 72 to the oven main burner 74 of the oven whose temperature is sensed by the bulb 50. The system is illustrated as incorporating a pilot burner 75 which is constantly lit and supplied with gas from the inlet line 72 so that it will ignite the gas at the main burner 74 when the switch 55 having the terminals 56 and 57 is closed. When the temperature of the oven, sensed by bulb 50, reaches that temperature manually set by knob 13, the switch opens to cause an interruption of gas flow to the main burner 74. Should the temperature of the oven drop, the switch 55 automatically closes and the main oven burner 74 is again set in operation to heat the oven to such predetermined pre-set temperature.

In the diagrammatic illustration in FIG. 8 it is noted that when the timer knob 16 is in its manual position, the lever pin 36 is on the outer portion of the disc 23, and in such inoperative position or condition of timer 9 the lever 30 is in its raised position and energy is stored in spring 32, and the temperature control knob 12 may be set to a low-temperature setting corresponding to an Off position and may be adjusted to any temperature setting between the markings 140 and Broil. In such case cooking may be accomplished without any time control and at any selected temperature; or cooking may be interrupted completely by positioning the knob 12 in its Off position.

Assuming that the temperature control knob 12 has been set to a temperature higher than 170° F., rotation of the timer knob 16 from its manual position results in the spring 32 causing the lever pin 36 to enter the V-notch 24 in disc 23 and thus causing the lever 30 to engage the pin 37 and move the temperature dial 12 to its 170° F. position, i.e. the Hold Warm temperature. In this Hold Warm position of timer knob 16, the timer is still inoperative and thus temperature of 170° F. will be maintained indefinitely. To initiate a timing cycle, the timer knob 16 is moved past its Hold Warm position to any selected time as, for example, 1, 2, 3 etc. hours. In such movement of timer knob 16 from its Hold Warm position, for example, the 1 hour position, the lever 36 is cammed out of the V-notch portion 24 by the gradually sloping cam surfaces of the notch in cam disc 20, and energy is stored in spring 32. The timer is then set and starts to time itself out, i.e. starts to return the knob 16 automatically to its Hold Warm position. Since disc 23 has a slightly larger diameter than disc 20, pin 36 rides on the periphery of disc 23 rather than cam disc 20. Consequently, as the initial return movement of timer shaft 21 moves only cam disc 20, disc 23 and pin 26 remain relatively fixed. After disc 23 commences rotation and its V-notch portion 24 reaches pin 36, the pin drops sharply into the notch. When the timer is set for a timing cycle, the temperature control knob 12 may be then adjusted to any temperature including Broil temperature, and after the timer times itself out, the lever pin 36 automatically enters the notch portion 24 and causes the lever 30 to engage and move the pin 37 to a position corresponding to the Hold Warm or 170° position. The pin 37, if desired, may be an adjustable pin which is adjusted to provide any other temperature or a much lower temperature corresponding to the Off position of the thermostat control.

It will thus be seen, as illustrated, that the operator cannot set the temperature dial 12 to a position higher than the Hold Warm temperature when the timer knob 16 is in its Hold Warm position. Further, when and as the timer knob 16 is moved in either direction from its Hold Warm position, useful energy is stored in the spring 32 which is used subsequently at the time the lever pin 36 enters the notch portion 24, to return the temperature control to the 170° setting, assuming, of course, that the temperature dial had previously been set to a higher temperature.

It is noted that the notched portion 24 in the disc 23 is defined by edges offering greater resistance to movement of the lever pin 36 from such notched portion and hence, the disc 23 having the notched portion 24 is loosely mounted on the timer shaft, and the cam plate secured to the timer shaft and having a more flat cam surface for camming the pin 36 out of the notch portion 24 is provided.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an oven control system, a manually adjustable temperature control including a gear rotatable to adjust the operating point of a switch; a timer having a shaft manually settable to different time settings including a disc rotated by said timer having a notch formed on its periphery; means interconnecting said temperature control and said timer for automatically moving said temperature control from one temperature setting to a predetermined setting after a period of time measured by said timer has elasped, said means including a lever having one end pivotally attached to a fixed support, a pin carried by said lever located to cooperate with the periphery of said disc and said notch, a spring urging said lever in a direction to hold said pin in engagement with the periphery of said disc, a sector gear mounted to rotate said temperature control gear, a pin carried by said sector gear, the opposite end of said lever being spaced from said sector gear pin when said lever pin engages the periphery of said disc whereby said sector gear is unaffected by said timer and may be set at a desired temperature such as said one temperature, said lever opposite end being urged by said spring into engagement with said sector gear pin when said disc has rotated so that said lever pin is moved into said notch, whereby said sector gear is moved to a position corresponding to said predetermined temperature.

2. The oven control system of claim 1 wherein said disc is loosely mounted on said shaft, and including a cam disc fixed to said shaft and secured to said loosely mounted disc so that limited relative movement between said discs is permitted, said notch having a generally V-shape, whereas said cam disc has a more gradually sloping cam surface effective upon manual setting of said timer to move said pin out of said notch.

References Cited by the Examiner

UNITED STATES PATENTS

| | | | |
|---|---|---|---|
| 2,233,139 | 2/1941 | McCullough | 200—38 |
| 2,416,084 | 2/1947 | Candor | 219—491 |
| 2,545,846 | 3/1951 | Dunn | 236—46 |
| 2,721,926 | 10/1955 | Baird. | |
| 3,172,998 | 3/1965 | Ferguson | 219—515 |

ALDEN D. STEWART, *Primary Examiner.*